United States Patent
Holt et al.

(10) Patent No.: US 12,291,393 B2
(45) Date of Patent: *May 6, 2025

(54) MOBILE VENTILATION STACK ASSEMBLY

(71) Applicant: HOLT LOGISTICS CORPORATION, Gloucester City, NJ (US)

(72) Inventors: Leo Holt, Gloucester City, NJ (US); Michael Fluehr, Gloucester City, NJ (US); Paul Grassi, Gloucester City, NJ (US)

(73) Assignee: HOLT LOGISTICS CORPORATION, Gloucester City, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/807,071

(22) Filed: Jun. 15, 2022

(65) Prior Publication Data

US 2022/0306376 A1 Sep. 29, 2022

Related U.S. Application Data

(63) Continuation of application No. 15/702,840, filed on Sep. 13, 2017, now Pat. No. 11,370,607.

(51) Int. Cl.
*B65D 88/74* (2006.01)
*A01M 13/00* (2006.01)
*B65D 88/12* (2006.01)

(52) U.S. Cl.
CPC .......... *B65D 88/74* (2013.01); *A01M 13/003* (2013.01); *B65D 88/121* (2013.01)

(58) Field of Classification Search
CPC ..... B65D 88/74; B65D 88/121; A01M 13/003
See application file for complete search history.

(56) References Cited

U.S. PATENT DOCUMENTS 11,370,607 B2 * 6/2022 Holt ..................... B65D 88/121
2011/0132592 A1 * 6/2011 Apple ....................... E21F 7/00
166/65.1

* cited by examiner

*Primary Examiner* — Steven S Anderson, II
(74) *Attorney, Agent, or Firm* — Law Offices of Nanda P.B.A. Kumar, LLC; Nanda P. B. A. Kumar

(57) ABSTRACT

The disclosure relates to devices and methods for ventilating enclosed area such as shipping containers or structures erected to temporarily contain cargo items. A central element in such devices and methods is a ventilation stack assembly in which a vertically-oriented stack having an outlet is connected at its other end to a pipe leading to an inlet. A first housing having the dimensions (and preferably the fittings) of a standard shipping container is rigidly connected to the stack and pipes, and the assembly can be physically manipulated as if it were a standard shipping container. Gas (e.g., fumigant) provided to the pipe inlet passes through the pipe and into and through the stack, exiting at the outlet, which can be situated at an altitude whereat gas discharged therefrom is dispersed into the atmosphere at a location and concentration at which displeasure or hazard to humans can be reduced.

21 Claims, 2 Drawing Sheets

MOBILE VENTILATION STACK ASSEMBLY

CROSS-REFERENCES TO RELATED APPLICATIONS

This application is a Continuation of U.S. application Ser. No. 15/702,840 filed on Sep. 13, 2017 now U.S. Pat. No. 11,370,607, which claims the benefit of U.S. provisional application No. 62/393,803 filed on Sep. 13, 2016, and the text of application 62/393,803 is incorporated by reference in its entirety herewith.

BACKGROUND OF THE DISCLOSURE

The invention relates generally to the fields of shipping, logistics, and fumigation.

Long-range transportation of materials is common in the modern economy. Materials produced and packaged in one geographical location are commonly placed within sealed shipping containers having standardized dimensions for containment and protection from damage (physical, chemical, or hygienic damage) during shipping. Materials can also be transported in breakbulk form or as bulk cargo (e.g., inside a ship) without the use of shipping containers. Use of shipping containers having standardized dimensions facilitates use of transport vessels (e.g., ships, railroad cars, aircraft, and trucks) and container-handling machinery (e.g., forklifts, reach stackers, straddle carriers, and cranes) which accommodate them. An example of such shipping containers is the common intermodal freight container, which is usually made of steel (optionally including insulation and a refrigeration system) and commonly occurs in either of two standardized sizes (colloquially referred to as "twenty foot" and "forty foot" containers).

Such shipping containers have the advantage of protecting desired goods (e.g., foodstuffs and manufactured wares) and packing materials (e.g., wooden pallets, burlap bags, or other containers or supports) from damage during shipping. However, the shipping containers also protect undesired materials, such as rodents, insects, molds, fungi, or other organisms which can damage or infect the desired goods. In many instances, it is not practically possible or economically feasible to exclude all of these organisms from a shipping container or, in the case of non-containerized cargo, to exclude these organisms from the packaging and cargo itself, during loading, storage, and/or transport. Furthermore, many of these undesirable organisms are carried on or within the cargo and/or packing materials, regardless of the presence or absence of a shipping container.

Undesired organisms can damage, consume, or degrade materials contained within shipping containers. Furthermore, such organisms can cause damage or disease at a location at which the shipping container is opened, packing materials are removed, or goods are unloaded. By way of example, insects not found in the United States which live (or have laid eggs on) wooden pallets holding carco can be transported together with the pallets from a non-U.S. country of origin and debark at a distant location upon unloading the cargo, and the insects can infest and/or damage local wildlife (e.g., trees) at the destination. Insects, molds, fungi, or other organisms can adhere to or survive within goods themselves, including in or on individual fruits, for example. It is therefore desirable to kill, inactivate, decrease the numbers of, or decrease the reproductive ability of (individually and collectively, "treating") any such organisms.

In view of the harm that can be caused by undesirable organisms present in cargos being transported around the world, countries, localities, their corresponding government agencies, and/or corporate entities can and have enacted laws, rules, or practices whereby in-coming and/or out-going cargos and/or shipping containers are treated for undesirable organisms.

Fumigation is a common method of treating organisms within a cargo or shipping container. Fumigation involves introducing a gaseous fumigant which is toxic or harmful to the undesired organism(s). Because the fumigant is in gaseous form, it tends to penetrate all spaces within the cargo, any packaging, and or a container which contains these, including porous materials such as masses of grains or coffee beans. Typically, the fumigant is retained within an enclosed area for a predetermined minimum period of time, the time being dependent on the identity of the fumigant, the type of undesired organisms that are actually or potentially present, the temperature, and other variable well known to skilled workers in this field. The enclosed area can be substantially any portion of three-dimensional space that contains the item(s) to be fumigated, such as a structural building, a structure made from flexible (e.g., plastic) sheets or tarps, a ship, an aircraft fuselage, a shipping container, or a combination of these. The materials used to delimit the enclosed area tend to prevent spread, flow, or diffusion of the fumigant from within the enclosed area to nearby spaces (although in practice many structures delimiting enclosed areas exhibit leaks or other minor release of fumigant from the enclosed area). The fumigant is usually removed prior to further handling of the fumigate item(s), so as to minimize the risk of subsequent human exposure to the fumigant.

Fumigants are selected, at least in part, on their ability to cause biological harm. Some are believed to cause environmental harms as well. Common fumigants include methyl bromide and phosphine gas, for example, both of which can be unpleasant, harmful, or even toxic to humans, depending on the concentration and duration of exposure. Methyl bromide can be harmful to humans in high concentrations. Moreover, its use has been limited or prohibited in some countries, owing to its possible identity as a 'greenhouse gas' and international agreements regarding such gases. Phosphine gas is likewise harmful in high concentrations, and is considered to have an unpleasant odor at lower concentrations. Other fumigants include nitrochloroform, dichloropropene, methyl isocynate, hydrogen cyanide, sulfuryl fluoride, and formaldehyde. Human exposure to all of these fumigants is undesirable at high concentrations.

Owing to the unpleasant and/or unhealthful characteristics of fumigants, shipping containers, packaging materials, and/or unpacked goods undergoing fumigation are typically placed in an opened state within a fumigant-resistant structure (i.e., in an enclosed area), such as a tarpaulin that is sealed about cargo items or another specialized structure designed to contain the fumigant. By way of example, a tent-like structure can be installed within a warehouse, the structure having flexible plastic "walls" which are attached to the roof of the warehouse and which can be raised or lowered at will. A container or one or more cargo items can be moved to the area within the walls while the walls are raised, and the walls can thereafter be lowered to the level of the floor to form an enclosed area that completely surrounds the container or other items within the lowered plastic walls. If desired, a shipping container can be opened and loaded or unloaded within the enclosed area. Fumigant generated or released within the tent can permeate the container and its contents or other items placed within the enclosed area, achieving its fumigating effect. Following fumigation, fumigant is released (e.g., to the atmosphere or, if desired, fed to an incinerator before venting the incineration exhaust) and the container can be sealed with its fumigated contents within it or, if the container or cargo is being fumigated upon unloading, the container or cargo can be removed together or separately. Typically, most or substantially all fumigant is removed from the enclosed area prior to handling of the fumigated container or cargo. Significant amounts of fumigant can remain in the enclosed area, within a container, or associated with cargo items, posing a potential hazard to subsequent handlers and workers. When release of fumigant from the structure is not performed carefully, fumigant concentrations that are hazardous or unpleasant for humans can develop at or near (e.g., downwind from) the site of release.

A substantial need exists for devices and methods for capturing, diluting, venting and/or dispersing fumigants in concentrations and/or places where they are not hazardous or unpleasant for humans. The present disclosure describes such devices and methods.

DETAILED DESCRIPTION

The disclosure relates to devices and methods for capturing and/or diffusing gases ventilated from enclosed areas which contain goods or containers being fumigated. Although the subject matter is described herein in the context of removing a fumigant used to kill or injure undesired organisms from an enclosed area, it is recognized that the same subject matter can be used to remove substantially any gaseous component including, by way of example, gases (e.g., ethylene) used to ripen or to inhibit ripening of fruit, gaseous combustion products, and inert gases meant merely to displace oxygen or air so as to reduce oxidation. In the context of describing the operation of the devices and methods described herein, each of these gases (regardless of intended use) is referred to as a "fumigant" or merely a "gas" for ease of discussion.

Figure 1:
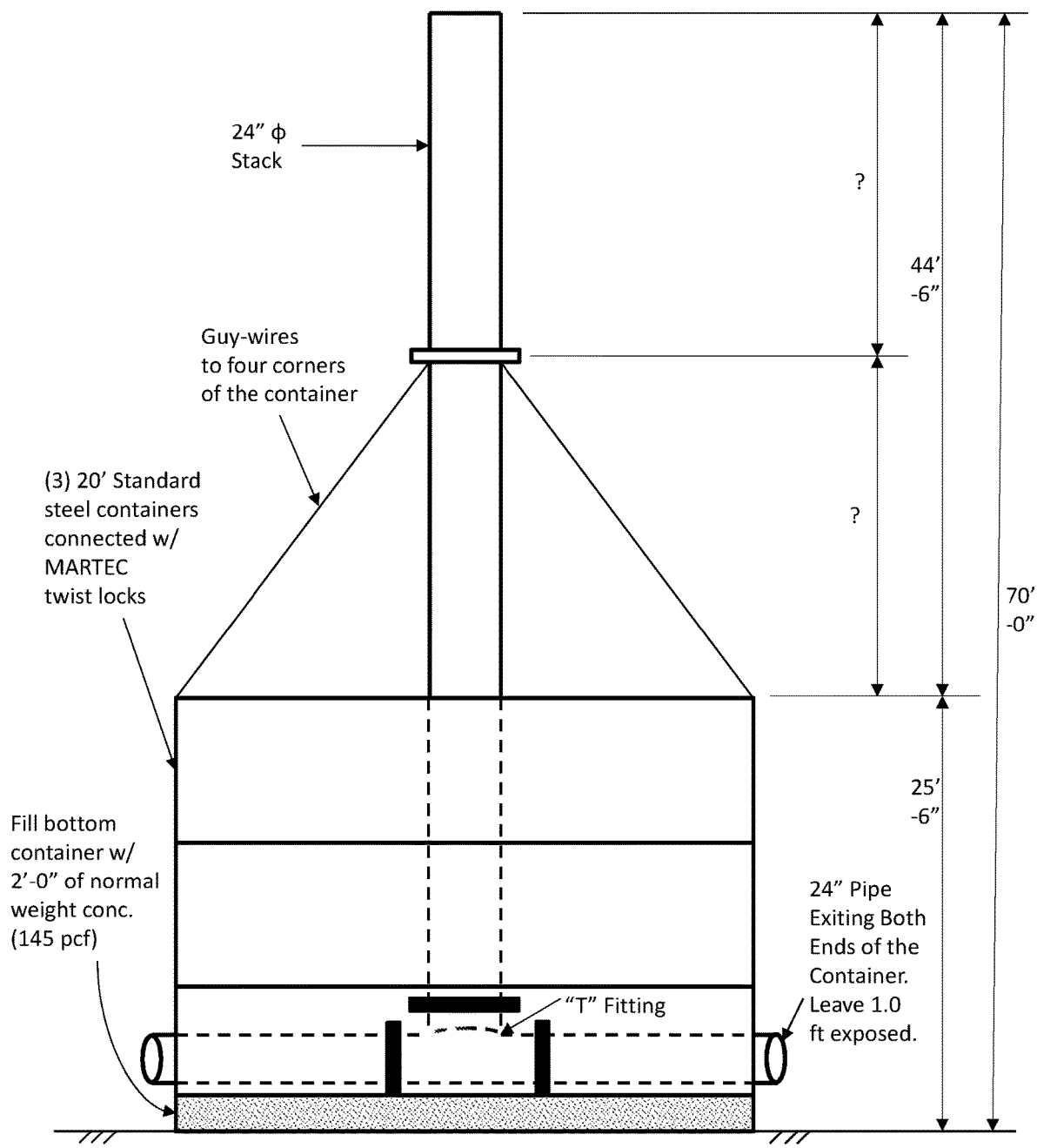
FIG. 1 is a diagram of an embodiment of the ventilation stack assembly described herein, wherein an upwardly-extending stack is fluidly connected with two pipes through either or both of which fumigant can pass by way of a 'T'-shaped connector connecting the stack and the pipes. In this embodiment, the stack and the pipes are connected within a first housing that is made from a twenty foot intermodal freight container that has been modified to permit the stack to pass through the roof thereof and the two pipes to extend through the two smallest opposed faces thereof. The first housing is partially filled with concrete to stabilize the stack assembly when it rests on a horizontal surface. Two additional housings (in this embodiment, two additional twenty foot intermodal freight containers modified to permit the stack to pass through their floors and tops) are stacked atop the first housing and secured thereto. Four guy wires connect the four top corners of the uppermost housing to a collar that is fastened to the stack above the uppermost housing. Sources of fumigant (e.g., the interior of an enclosed area containing a fumigant) can be connected to the open ends of either of the two pipes extending from the ends of the first housing. Application of air pressure to the two pipe openings will cause gases within the pipes and the stack to ascend the housing and emerge from the upper end of the stack, which in this embodiment is situated at an altitude 70 feet above the horizontal surface upon which the stack assembly rests. Exiting gases can be diffused in air currents present at that altitude.

A significant element of the devices and methods described herein is a stack assembly, one embodiment of which is illustrated in FIG. 1.

The stack assembly includes a tubular stack that extends substantially vertically and is connected to one or more tubular pipes through a fitting (preferably a substantially right-angle fitting) such that the interiors of the stack and the pipe(s) are in fluid communication. The stack, the pipe, or both are secured to a first housing which has the dimensions of a standard shipping container. The first housing can include a ballast to provide weight (and resistance to tipping) to the stack assembly, and the weight of ballast used is preferably at least about the weight of the stack, or much greater. The stack assembly can include one or more additional housings stacked atop the first housing. Such additional housings, when present, should also have the dimensions of the a shipping container, preferably the same standard shipping container as the first housing. One or more lines (herein "guy wires") can connect a fitting (e.g., a collar) secured to the stack to one or more of the housings, to provide stability (i.e., resistance to movement attributable to gravity or momentum while moving the stack assembly, or resistance to wind pressure while the stack assembly is stationary) to the stack, relative to the housing(s).

Further details of the portions of the stack assembly are described below.

The Stack

The stack is a hollow, tubular structure that, in operation, will extend generally vertically. The purpose of the stack is to facilitate conveyance of gases in a direction from the bottom (i.e., earth-side) of the stack toward its top (i.e., sky-ward) side.

The precise shape, length, and material of the stack are not critical, and should be selected to contain gas within its interior during conveyance during operation as described herein. The stack can be made of metal or plastic, for example, and should be sufficiently rigid that it will hold its shape in the presence of the gases expected to be conveyed through it and under the environmental conditions (e.g., locally prevalent winds, sunlight intensity, and precipitation) in which it will be used. A wide variety of metal pipes, both smooth and corrugated are suitable, as are plastic (e.g., PVC) pipes. The stack may be composed of multiple tubes (e.g., two circular tubular metal pipes), if desired, but this is not preferred. The cross-sectional shape (e.g., round, square, oval, triangular) is not critical. For ease of supply and construction, hollow pipes having a circular cross-section are appropriate.

The stack has an opening (i.e., an outlet) at its upper end and connects with one or more pipes (described below) at its lower end. A gaseous material, such as fumigant removed from an enclosed area, is received by the stack at its lower end and, in the presence of greater gas pressure or gas movement at the lower end, the gaseous material is induced to move upwardly through the stack, venting (i.e., exiting from the stack) at the opening at its upper end.

The length of the stack is not critical, but is selected to vent gas at an altitude above the horizontal surface upon which the assembly stack rests that provides sufficient atmospheric dispersion of the gas that the hazard or unpleasantness of the gas to humans is reduced below a desired level (e.g., below the level specified in a regulation or below a level that is subjectively considered unacceptable to nearby residents). Methods for calculating stack heights necessary to produce a desired degree of gas dispersion are known in the art (See, e.g., Beychok, *Fundamentals of Stack Gas Dispersion*, 4th ed., 2005, ISBN 0-9644588-0-2). Such calculations will depend upon the identity and volume of the gas(es) being vented, the hazard or unpleasant characteristic to be avoided, prevalent local meteorological conditions, local topology and obstacles, for example. For land-based ventilation stacks (e.g., at container-loading and—unloading dockyards), a stack outlet altitude of at least about 70 feet above the ground surface will normally suffice in relatively flat terrain. Shorter (e.g., as short as 40 feet or less) or taller (e.g., 90-100 feet or more) stacks can also be appropriate, depending on the factors described herein. Stack height can also be determined empirically, for example by using a selected stack height for a limited time, measuring gas concentrations (or detectability, such as odor) nearby, and increasing or decreasing stack height accordingly. For shipborne ventilation stacks (e.g., on a container vessel), a stack outlet altitude of at least the ship's-exhaust outlet will tend to be sufficient.

The internal area of the stack (i.e., the cross-sectional space through which the gas is to flow) is not critical, other than that it should be sufficient to convey the anticipated volume of gas that will be generated in use without requiring specialized or expensive gas-moving equipment. Sizing of exhaust pipe cross-sectional areas such as here is within the level of ordinary skill in this field.

The size of the stack and the material from which it constructed will influence its weight and the effect of that weight on the overall stability of the stack assembly. For example, a heavier stack will tend to destabilize the stack assembly—an effect that can be counteracted by including a greater weight of ballast in the first housing.

The Pipes

The stack assembly includes at least one, preferably two, and possibly more, pipes which convey a gas to be ventilated from a source of the gas to the stack. The pipes contain the gas during that conveyance. Thus, the precise shape, size, and length of each pipe is not critical, nor is the material from which it is made.

Like the stack, the material from which each pipe is constructed should be constructed to that it is sufficiently rigid that it retains its shape during conveyance of gas from its source to the stack, taking into account the chemical and physical nature of the gas to be conveyed. Metal or plastic pipes of substantially any cross-sectional shape will suffice. For ease of construction and availability of materials, ordinary cylindrical pipes can be used, as can rectangular or deformable materials commonly used as ductwork in industrial or residential settings.

Preferably, each pipe is substantially rigid and extends from its connection to the stack at least through (and preferably beyond) a face of the first housing to an inlet end of the pipe. However, the length of each pipe can be selected so that it is contained within the first housing; this is important if, for example, the first housing is a shipping container and the pipe extends from its junction with the stack within the shipping container toward one of the end-doors of the shipping container and closing of the doors at that end is desirable (e.g., for protection, storage, or shipping of the housing). Alternatively, multiple disassemblable pieces of pipe can be used such that, when assembled the portions of the pipe extend from the lower end of the stack beyond the position of the first housing at which end-doors of a shipping container would normally be present, but such that when disassembled, the pipe does not extend beyond that position (and, optionally, the disassembled pieces can be stowed within the housing, e.g., for shipping).

The form of the inlet is not critical, and can be any form or configuration that will facilitate transfer of gas from an exterior source into the interior of the pipe. This arrangement facilitates connection of a gas source to the pipe at or near the face of the first housing, such that gas from the source will be conveyed into the pipe inlet, through the pipe (and within the housing) to the stack and thence to the stack outlet. By way of example, the pipe can be a rigid cylindrical pipe which extends about a foot beyond one face of the housing, as illustrated in FIG. 1. Also as illustrated in FIG. 1, the housing can have multiple pipes secured to it, each of the pipes fluidly connecting to the stack within the housing.

The inlet end of a pipe preferably includes one or more fittings for attaching gas-handling equipment (e.g., rigid or flexible ducts or hoses for conveying a gas to be vented through the pipe and stack, optionally using gas-moving equipment as described herein, such as a gas conveyor). Such fittings permit users of the stack assembly to attach a gas source (e.g., an outlet line leading from a shipping container that is undergoing fumigation or an enclosed area within which goods have been unloaded from a ship, an aircraft, or shipping container) to the pipe inlet end in order to direct gases from the gas source to the stack. Any of a wide variety of gas-handling fittings can be used (e.g., snap-fit connections, frictional connections, flange-to-flange connections with or without a gasket, or screw-type connections), and such fittings are preferably substantially gas tight, so as to reduce exposure of users to gases flowing through the fittings. The inlet end (and any associated fittings) are preferably situated on the first housing in such a manner as to render the area of the pipe inlet(s) well-ventilated. As shown in FIG. 1, for example, the pipe inlets can be situated at the ends of the first housing, extending slightly therefrom, so that any gas which may escape at the pipe inlet can be removed from the area of escape, rather than accumulating (e.g., as might occur if the pipe inlet were within the closed space of the first housing).

The interior of each pipe fluidly connects with the interior of the stack at a fitting end of the pipe, so that gas flowing from the open end toward the fitting end of the pipe will pass into the interior of the stack after exiting the fitting end of the pipe. The connection between each pipe and the stack is preferably substantially gas-tight, so that substantially all gas flowing through the pipe enters the stack. The exact nature of the connection is not critical. For ease of construction and availability of materials, it can be preferable to use standard piping connectors (e.g., tubular right-angle or 'T'-shaped pipe connectors), and these can be frictionally fit, flange-bolted, or welded, for example. Flexible, moldable, or welded connections are also suitable. As illustrated in FIG. 1, a pair of pipes can be connected to the stack using a 'T'-shaped connector having bolted flange-type pipe connectors fitted about the fitting end of each pipe, the lower end of the stack, and each of the three openings of the 'T'-shaped connector. Because it can be advisable to fully or partly disassemble the stack when moving the stack assembly, the stack is preferably disassemblable from the pipe(s), either at the lower end of the stack or at an intermediate position between its upper and lower ends (e.g., at about the position at which the stack emerges from the first housing or the uppermost housing).

The pipes will generally be arranged substantially parallel to the surface upon which the housing rests, meaning generally horizontally for a ventilation stack assembly designed to rest on a flat area of ground. Such an arrangement is not critical, however, so long as the pipes fluidly connect with the stack, preferably within the first housing.

Gas-moving equipment can be associated with, or included within a pipe (e.g., attached at the inlet end of the pipe or between the pipe and the stack) or associated with, or included within the stack (e.g., at the base of the stack, within the stack, or at the outlet of the stack). By way of example, simple gas conveyors such as fans or turbines can be installed in fluid communication with the interior of a pipe to induce gas movement therethrough. Similarly, gas discharge nozzles (for introducing gases into a pipe), vacuum orifices (for withdrawing gases from a pipe), or other known equipment for inducing gas flow can be used. The cross-sectional area (e.g., diameter for a hollow cylindrical pipe) of the pipe should be selected to accommodate a desired gas flow for convenient use. By way of example, when an a maximal expected gas handling rate and gas handling equipment are selected, a pipe cross-sectional area can be readily calculated using well-known methods.

In one embodiment, one or more gas conveyors are contained within a manifold having at least one intake and at least one outlet. The manifold functions to draw gas into its inlet(s) and to expel the drawn-in gas out from its outlet(s). A manifold having multiple inlets and/or outlets can be equipped with covers or seals to plug unused inlets or outlets in order to facilitate connection of multiple manifold inlet(s) to the same or separate enclosed areas containing fumigant, connection of multiple manifold outlet(s) to a single or multiple stacks, or a combination of these. By way of example, a manifold can have two intakes, each fluidly connected with the interior of a different enclosed areas containing fumigant (and the two enclosed areas can contain the same or different fumigants), while being fluidly connected through a single outlet with a single stack. Alternatively, a manifold can fluidly connect the interior of a single enclosed area with two different stacks, each stack being connected to a different outlet of the manifold, and the manifold can be fluidly connected with the enclosed area by way of a single intake manifold or multiple ones.

The First Housing

The first housing serves both as a stabilizing support base upon which the ventilation stack assembly rests and to secure at least one of the stack and the pipe(s) (and preferably both the stack and all pipes). Furthermore, the first housing has the dimensions of a standard shipping container (e.g., the size and shape of a common twenty foot intermodal freight container), which permits it to be manipulated using standardized freight container-handling equipment, such as forklifts, reach stackers, straddle carriers, and cranes. Because this equipment will often be present at locations at which the ventilation stack assembly is to be used, the ventilation stack assembly can be readily moved around the location as needed.

The first housing includes at least a frame that has the dimensions of a standard shipping container, and preferably includes the fittings (e.g., corner twist-lock connectors) typically present on such containers. In a preferred embodiment, the first housing is made from such a container (e.g., one which has been rendered unsuitable for use as a container owing to puncture of its sides).

The junction(s) of the stack and the pipe or pipes of the ventilation stack assembly is contained within the first housing. The first housing is rigidly connected with at least one of the stack and the pipes which join the stack within it. This rigid connection causes the stack, the pipe(s) and the first housing to be movable as a single rigid unit. Preferably, the first housing is rigidly connected with the stack and also with each pipe which connects with the stack within the first housing. By being rigidly connected with each of these, the rigidity of the entire ventilation stack assembly can be increased.

The means by which the first housing is connected with the stack and/or pipe(s) is not critical, and any rigid connection can be use. By way of example, the first housing can be welded to the stack where the stack extends through an otherwise-solid wall of the first housing and/or to a frame attached to the housing. Similarly by way of example, the first housing can be welded to each pipe where the pipe extends to or through an otherwise-solid wall of the first housing and/or to a frame attached to the housing. The first housing can have a frame (e.g., pipes or beams welded to the structural elements of the first housing, such as to the frame elements of a shipping container) situated therein (whether rigidly connected to the first housing or not) for supporting the weight of the stack and/or pipes. Whatever the details of the connections between the first housing and the stack and between the first housing and the pipe(s), the desirable outcome is a rigid, resilient ventilation stack assembly that can be practically moved through manipulation of the first housing (and optionally other housings) without damaging the connections among the stack, the pipes, and the first housing.

When a shipping container is used as the first housing, the end-doors of the shipping container can be removed. Alternatively, they can be left on and operable, so that they can be closed—around the pipe(s) if the doors are modified to remove the section(s) that would otherwise interfere with the pipe, or with the end of the pipe within the container if the pipe is sufficiently short or disassemblable.

Ballast

The first housing preferably (but not necessarily) contains or includes a ballast for providing weight to the first housing and, thereby, to the base of the ventilation stack assembly.

The identity of the ballast is not critical, and the ballast can be readily removable or substantially irremovable. By way of example, movable ballast can take the form of a liquid contained by walls of the first housing, or of particulate material (sand, gravel, or concrete rubble). Movable ballast can be useful for reducing the weight of the ventilation stack assembly, such as when it is being moved about a location or loaded aboard a ship. The movable ballast can be removed prior to such movement and replaced thereafter. By way of example, immovable ballast can take the form of a settable material (e.g., poured cement or concrete) or an adhered material (e.g., scrap metal welded to the first housing frame) that is substantially fixedly associated with the first housing.

The amount of ballast included with the first housing is not critical and can be readily determined by a skilled artisan in this field. Generally, a greater amount of ballast will result in greater stability (i.e., resistant to tipping) of the ventilation stack assembly, while less ballast will reduce its weight and improve the ease of transporting the assembly (especially if the housing is moved with the stack assembled to the pipes).

Additional Housings

One or more additional housings, having the same dimensions as the first housing, can be stacked atop (i.e., on the face through which the stack extends of) the first housing. Like the first housing, each additional housing can be an actual standardized shipping container, a damaged (i.e., no long suitable for shipping) standardized shipping container, merely the frame of a standardized shipping container, or a frame designed simply to mimic the size and shape of the frame of a standardized shipping container.

The method or mechanism by which the additional housings are attached to the first housing are not critical. They can, for example, be welded together or fastened using standard shipping container fasteners, provided that both the first housing and the additional housing bear fittings compatible with such fasteners.

The stack extends through the top and floor (i.e., bottom) faces of each additional housing, and the stack can be rigidly attached to each additional housing (e.g., welded to a solid face through which it extends or connected to a frame attached to the additional housing) if desired.

Each additional housing preferably has the fittings associated with a standardized shipping container, such as the twist-lock connections at its corners. The presence of these fittings permits the ventilation stack assembly to be treated and handled as though it is a stack of standardized shipping containers (e.g., picked up and moved from location-to-location about a site).

Like the first housing, each additional housing can both support the stack (the first housing can also support the pipe(s)) and shield the stack from damage from trucks, cranes, shipping containers, or other objects which might otherwise incidentally impact the stack while in use. Substantial physical movement of machinery and shipping containers is common at sites at which shipping containers are manipulated (e.g., marine terminals, warehouses, and shipping centers). When the stack (and pipe(s)) are contained within a housing (e.g., a modified shipping container), the housing can bear the damage from such potential collisions, rather than the stack.

Stack Fitting(s) and Guy Wires

In order to provide additional rigidity to the stack, the stack can have one or more fittings thereon, and one or more lines can connect those fittings to portions of the first housing or an additional housing. Rigidification of stacks, poles, and other extended members using such lines is well known in the art, and substantially any method of providing such rigidification can be employed.

By way of example, the fitting can be a perforated collar that is attached (e.g., welded) to the stack about two-thirds of the distance between the top surface of the uppermost housing and the outlet of the stack (i.e., the collar being situated nearer the stack). Metal guy wires can be tautly secured between the perforations of the collar and, for example, the four corners of the uppermost housing.

The Enclosed Area Containing Fumigant

The stack of the ventilation stack assembly described herein can be used to safely exhaust fumigant from an enclosed area (e.g., the interior of a shipping container, the interior of a sealed building, or the interior of a structure formed, in whole or in part, using flexible plastic of fabric sheets) in which the fumigant is present by fluidly connecting the interior of the stack and the interior of the enclosed area through the interior of the pipe. If the density of the fumigant is substantially less than the density of air (or whatever other gas may be present at the stack outlet), then exhaust of the fumigant can be achieved (albeit relatively slowly) by merely permitting air to settle into the enclosed area and fumigant to rise out of the stack by fluidly connecting the two. Similarly, even when the fumigant is about equally dense as air at the stack, simple of diffusion of the fumigant through the ventilation stack assembly and out the stack outlet will occur, but generally too slowly to be of commercial importance.

The rapidity with which a fumigant is exhausted from an enclosed area can be substantially increased by inducing convective flow of gas from the enclosed area, through the ventilation stack assembly, and out the outlet of the stack. Convective gas flow can be induced by introduction of gas into the enclosed area, by generation of gas within the enclosed area, by withdrawal of gas from the stack when it is connected to the enclosed area in a substantially gas-tight manner, or by a combination of these. Commonly, convective gas flow is induced using gas conveyors, such as fans, turbines, vents, blowers, and other common air-handling equipment. Such gas conveyors can be used in connection with the ventilation stack assembly described herein in conventional ways, and can be fluidly connected in line with the assembly, the enclosed area, or both. By way of example, a gas conveyor (e.g., a fan or a manifold containing a blower) can fluidly connect the interior of a fumigation container with the interior of a pipe of the assembly. Activation of the conveyor will tend to draw gas from within the enclosed area and impel it into the pipe and thence up the stack and out from the stack outlet. Gas flow can be increased further by venting air or other gas into the interior of the enclosed area (e.g., by positively injecting gas therein or by permitting ambient air to flow into the enclosed area through, for example single-direction vents). A gas conveyor can also be incorporated within the assembly itself, if desired—for example interposed between the stack and a pipe, or at the stack outlet.

The identity and form of the structure(s) used to make the enclosed area are not critical. Such enclosed areas will generally be closed to the atmosphere (so as to contain fumigant therein) and have one or more outlets which can be connected with gas-handling equipment, such as gas conveyors, and one or more vents for admitting ambient (fumigant-free) gas into the enclosed area. By way of example, a standard shipping container can be used to contain a fumigant therein by generating fumigant within (or injecting fumigant into) the container. If one end of the shipping container is fluidly connected with the stack assembly described herein, fumigant can be withdrawn from the container and vented from the stack outlet; gas throughput can be increased (and fumigant withdrawal speeded) by allowing atmospheric air or another gas to enter the shipping container to replace withdrawn gas (e.g., by opening a door or vent of the shipping container).

In another embodiment of a fumigation container, a dedicated, free-standing building can be constructed, and materials (e.g., cargo items or opened shipping containers) to be fumigated placed within it. Upon generation or injection of fumigant within the building, the building can sealed from its surroundings to prevent migration of fumigant from within the building to those surroundings. The ventilation stack assembly described herein can be connected (if it was not previously) to the interior of the building (which, here, is the enclosed area) and fumigant can be vented therefrom at a selected time (e.g., after a fumigation procedure). Air or other gas can be provided to the interior of the building to increase gas flow rates and speed removal of fumigant. Such gas provision can be effected using negative-pressure-activated vents (e.g., slat-type ventilation vents), dedicated gas lines, or in any other manner that will result in gas supply to the interior of the building. Rather than a permanent building, temporary structures can be used, such as tents, sheets or flaps of gas-impermeable plastic, tarpaulins, fabric sheets, or other materials can be used to contain a fumigant within an enclosed area delimited by the temporary structures (optionally, in combination with a more permanent building, as with plastic sheeting extending between the roof and floor of a warehouse) until it can be vented therefrom using the ventilation stack assembly described herein. Materials (e.g., fruit or packing materials to be fumigated can be loaded into such temporary structures or the structures can be built or moved around the materials to be fumigated.

Using the Ventilation Stack Assembly

The ventilation stack assembly is used by fluidly connecting a source of a gas to be ventilated (e.g., the interior of an enclosed area containing a fumigant) with the interior of at least one pipe of the assembly. Each other pipe is either connected to the same or another source of the gas or is closed (e.g., using a valve, a gas-tight seal, or a solid plate). Once this connection is made, the gas is able to flow from the enclosed area, through the pipe, into and along the stack, and thence vent at the stack outlet. Flow of gas can be significantly accelerated by passing a fluid (e.g., more of the gas, air, or a non-reactive gas such as nitrogen) through this system, such as by introducing the fluid at the source.

By way of example, fumigation of a shipping container can be performed by fluidly connecting a source of a gaseous fumigant to the interior of the shipping container after fluidly connecting the interior of the shipping container to the interior of a pipe of the ventilation stack assembly. As the fumigant gas is passed into the shipping container, it will exhibit its fumigant effects within the shipping container, and exit the container into the pipe. Once in the pipe, the fumigant gas will pass through the pipe, through the connection between the pipe and the stack, up the stack, and 'out' the outlet of the stack. If that outlet is situated at an altitude of 70 feet above ground, for example, any remaining fumigant gas in the outlet stream will disperse within air 70 feet above the ground. This altitude can be selected to avoid unpleasant or hazardous effects of the fumigant gas affecting humans or animals in the vicinity of the ventilation stack assembly.

After fumigant gas has been passed into and through the enclosed area for a desired time period, another fluid such as ambient air can continue to be passed into and through the enclosed area. This has the effect of 'flushing' or diluting any remaining fumigant gas from the enclosed area, yielding a enclosed area which will exhibit less unpleasant or hazardous conditions to people subsequently handling or unloading items within the enclosed area than would have been the case absent such flushing or dilution.

Figure 2:
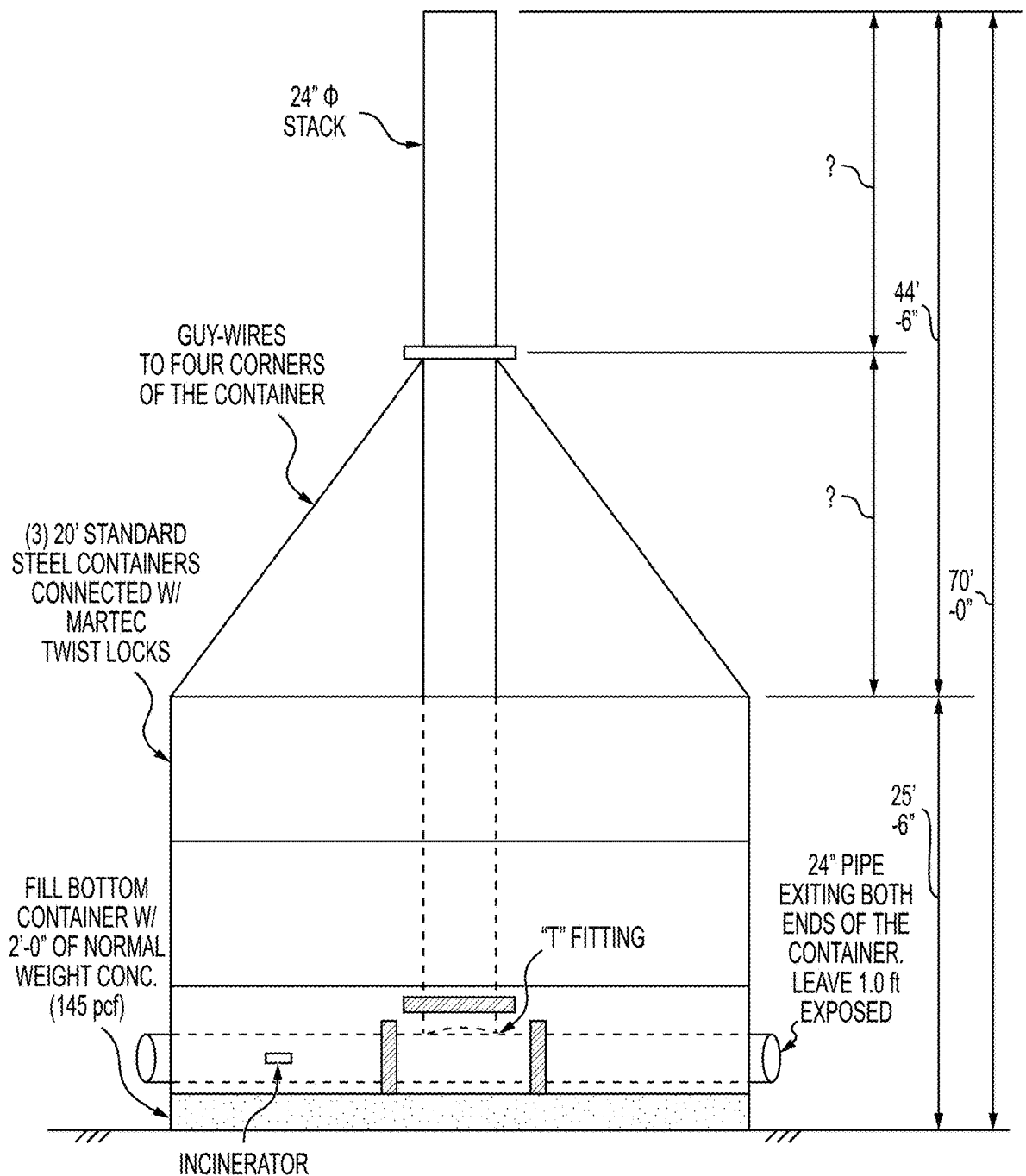
FIG. 2 is an illustration of an embodiment of the invention showing an incinerator within the mobile ventilation stack assembly between the inlet end of a tubular pipe and the outlet of the ventilation stack assembly.

In another example, an incinerator (shown in FIG. 2, a diagram of an embodiment of the ventilation stack assembly described herein) can be included within the ventilator stack assembly, in the fluid flow stream including the pipe(s) and the stack, with the incinerator igniting and burning at least a portion of the fumigant gas. Such an assembly will reduce the quantity of fumigant gas released to the atmosphere at the stack outlet.

In yet another example, the ventilator stack assembly can have a stack having an outlet that connects with a fumigant gas recovery system. Such an assembly can reduce atmospheric release of the fumigant gas, and can potentially facilitate recycling of the gas or treatment of the gas (e.g., scrubbing of exhaust streams and/or chemical reaction of the fumigant to render it less hazardous to humans or the environment).

The ventilation stack assembly disclosed herein can be used on land (e.g., at a dockside, railside, or airport facility for preparing shipping containers for loading or for processing unloaded shipping containers). Owing to its compactness and compliance with shipping container size parameters, the ventilation stack assembly can be loaded onto, for example, a ship (optionally with the stack removed temporarily), either for transportation or for use en route. Furthermore, because the housings have the dimensions of standard shipping containers, they can be manipulated (e.g., lifted, moved, or disassembled) using equipment likely to be already present for other purposes at the site of use. For example, ports, airports, rail yards, and other transportation depots used for shipment of goods requiring fumigation will ordinarily be equipped with container-handling machinery (e.g., cranes, trucks, reach stackers, fork lifts, and straddle carriers) adapted to accommodate standard-size shipping containers. Moreover, the common presence of damaged or unused shipping containers at such sites provides a ready source of materials for making the stack assembly described herein.

EXAMPLE

The subject matter of this disclosure is now described with reference to the following Example. This Example is provided for the purpose of illustration only, and the subject matter is not limited to this Example, but rather encompasses all variations which are evident as a result of the teaching provided herein.

A warehouse is fitted with flexible plastic sheets attached to and hanging from the gas-impermeable ceiling thereof. The sheets are arranged in a continuous or overlapping manner so that, when permitted to drape their full length from the ceiling to the floor, they form a rectangular enclosure. Materials to be fumigated are moved within the boundary of the rectangular enclosure, and the sheets are draped completely around the materials. Fumigant is generated within the closed structure and permeate the materials. After a selected fumigation time, the inlet of a first flexible duct is inserted under the plastic sheeting material at one extent of the rectangular structure, and the plastic material is draped over the outside of the duct, so that the interior of the duct is in fluid communication with the interior of the enclosure. The other end of the duct is connected with the inlet of a manifold which contains a gas conveyor. An outlet of the manifold is fluidly connected, via a second flexible duct, to the inlet end of a pipe of the ventilation stack assembly described herein. When the gas conveyor is actuated, it withdraws gas (including fumigant) from within the enclosure, conveys it through the first flexible duct, the manifold, the second flexible duct, the pipe and stack of the assembly, and the gas vents out from the stack outlet. Before or after actuating the conveyor, the enclosure is vented (e.g., by fluidly connecting its interior with a vent, by lifting a portion of the plastic sheet to allow ambient air inflow, or otherwise) to enhance gas flow into and through the enclosure. The conveyor remains actuated until a desired degree of fumigant removal is achieved, and it is then de-actuated.

The disclosure of every patent, patent application, and publication cited herein is hereby incorporated herein by reference in its entirety.

While this subject matter has been disclosed with reference to specific embodiments, it is apparent that other embodiments and variations can be devised by others skilled in the art without departing from the true spirit and scope of the subject matter described herein. The appended claims include all such embodiments and equivalent variations.

What is claimed is:

1. A mobile ventilation stack assembly comprising:
a substantially vertical tubular stack having an upper end terminating in an outlet and a lower end;
at least one tubular pipe, containing multiple disassemblable pieces, extending from a fitting end to an inlet end, the fitting end being fluidly connected with the lower end of the substantially vertical tubular stack; and
a first housing having the dimensions of a standard shipping container, having a bottom for resting on a substantially horizontal surface, and being rigidly connected to the substantially vertical tubular stack and the at least one tubular pipe wherein said rigid connection allows the substantially vertical tubular stack, the at least one tubular pipe and the first housing to be movable as a single unit,
wherein the at least one tubular pipe extends from the fitting end through one of the opposed smallest faces of the first housing to the inlet end, wherein the inlet end is fluidly connectable to a source of a fumigant to be ventilated to permit a user of the mobile ventilation stack assembly to attach the source of the fumigant to the inlet end,
an incinerator included within the mobile ventilation stack assembly between the inlet end of the at least one tubular pipe and the outlet of the ventilation stack assembly,
wherein the incinerator ignites and burns at least a portion of the fumigant provided to the inlet end of the at least one tubular pipe
whereby the fumigant flows through the at least one tubular pipe, into the substantially vertical tubular stack, through the substantially vertical tubular stack, and thence through the outlet of the substantially vertical tubular stack.

2. The assembly of claim 1, wherein the outlet is situated at least about seventy feet above the substantially horizontal surface.

3. The assembly of claim 1, wherein the first housing is rigidly connected to the substantially vertical tubular stack and the at least one tubular pipe.

4. The assembly of claim 1, further comprising at least one additional housing connected to the top of the first housing, each additional housing having the dimensions of the standard shipping container, wherein the substantially vertical tubular stack extends through the top and floor of each additional housing.

5. The assembly of claim 1, wherein the first housing is a standard twenty-foot intermodal freight container, the substantially vertical tubular stack extends through the top surface of the container.

6. The assembly of claim 5, comprising an additional tubular pipe extending at least about a foot through opposite opposed smallest faces of the container.

7. The assembly of claim 1, further comprising a ballast contained within the first housing, the weight of the ballast being at least about the weight of the substantially vertical tubular stack.

8. The assembly of claim 1, wherein the substantially vertical tubular stack has a fitting thereon and a line tautly connects the fitting and the first housing of the assembly.

9. The assembly of claim 4, wherein the substantially vertical tubular stack has a fitting thereon and a line tautly connects the fitting and a housing of the assembly.

10. The assembly of claim 9, wherein the line tautly connects the fitting and the uppermost housing.

11. The assembly of claim 1, wherein the at least one tubular pipe and the substantially vertical tubular stack are connected at substantially a right angle.

12. The assembly of claim 1, wherein the first housing includes connector fittings for a standard shipping container.

13. The assembly of claim 12, wherein the connector fittings are twist-lock connector fittings.

14. The assembly of claim 1, wherein the substantially vertical tubular stack is disassemblable from the at least one tubular pipe at the lower end of the substantially vertical tubular stack or at about the position at which the substantially vertical tubular stack emerges from the first housing or an additional uppermost housing, and removable from the assembly.

15. A method of ventilating a fumigant from an enclosed area, the method comprising fluidly connecting the enclosed area to the inlet end of the at least one tubular pipe of the assembly of claim 1 and thereafter injecting a fluid into the enclosed area, whereby the fumigant is displaced from the enclosed area into and through the at least one tubular pipe, into and through the substantially vertical tubular stack, and thence from the outlet.

16. The method of claim 15, further comprising subjecting the gas to incineration between the inlet end of the at least one tubular pipe and the outlet.

17. A ventilation system comprising the ventilation stack assembly of claim 1 and a manifold, the manifold comprising a closed body containing a gas conveyor, the body having an outlet fluidly connected with the inlet end of the at least one tubular pipe and at least one intake.

18. The system of claim 17, wherein the manifold intake is fluidly connected with an enclosed area.

19. A ventilation system comprising the ventilation stack assembly of claim 1, an intake line, and a gas conveyor, each fluidly connecting the intake line with the inlet end of the at least one tubular pipe.

20. The system of claim 19, wherein an enclosed area is also fluidly connected in line with the gas conveyor and the intake line.

21. The assembly of claim 1, wherein said rigid connection comprises a welded connection.

* * * * *